Patented June 2, 1942

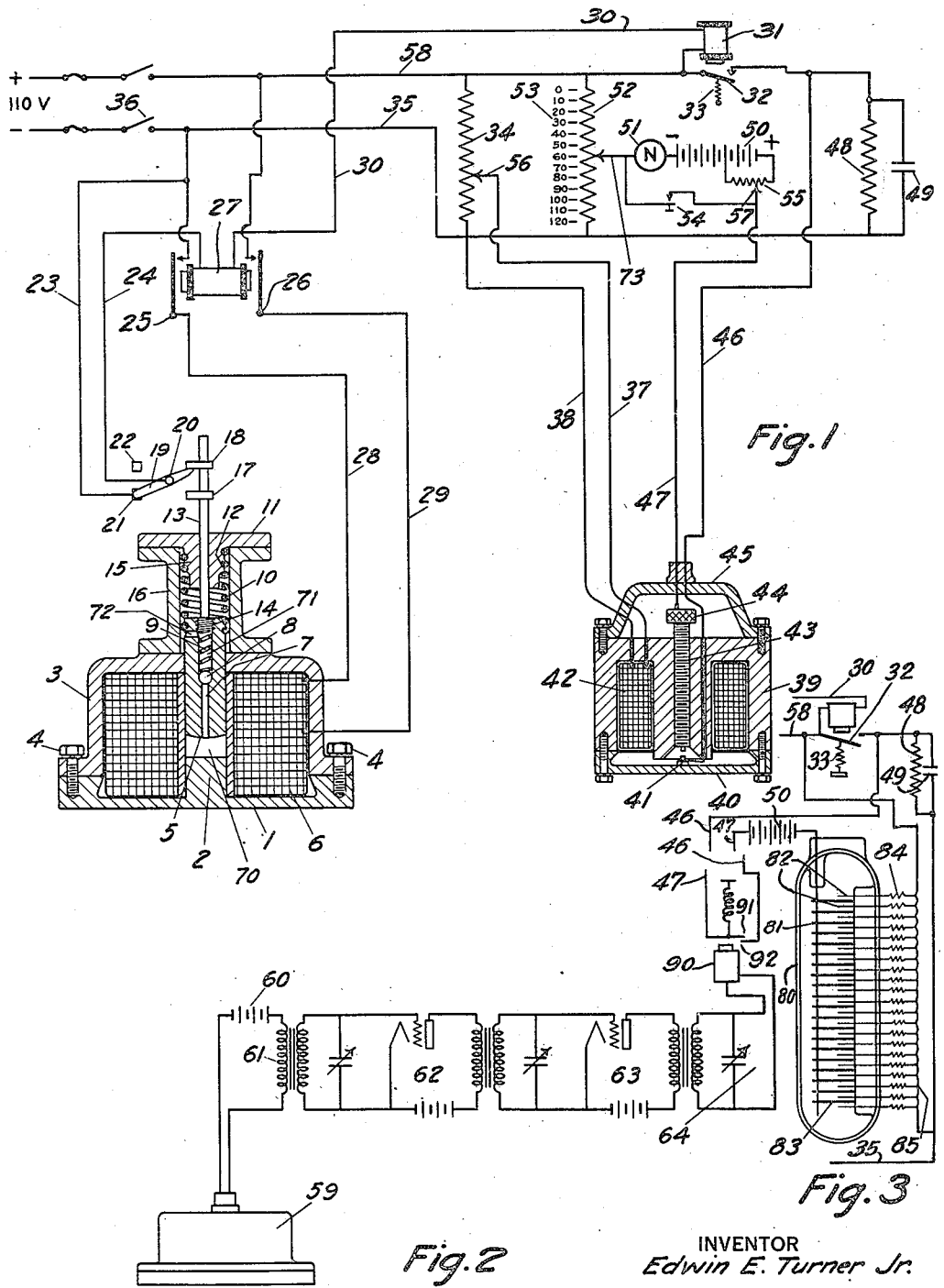

2,284,699

UNITED STATES PATENT OFFICE 2,284,699

DISTANCE MEASURING DEVICE

Edwin E. Turner, Jr., West Roxbury, Mass., assignor to Submarine Signal Company, Boston, Mass., a corporation of Maine Application April 9, 1932, Serial No. 604,255
Renewed December 21, 1939

19 Claims. (Cl. 177—386)

The present invention relates to a system for depth or height measurement in which the time interval is measured between the emission of a compressional wave impulse and the receipt of a reflected impulse or signal from the object or body whose distance is to be measured.

A primary object of the present invention is to provide a simple, cheap, manually or automatically operated device which has substantially no moving parts in the indicator or control mechanism and which therefore would be inherently very inexpensive. Efforts to construct depth measuring devices with the advantages of the present invention have been defeated because if no moving indicator is provided, it is very difficult to produce a mechanism which will periodically operate the compressional wave producer. In systems of the prior art it has been the custom to have the operation of the sound producer controlled by the indicator when it is at or near its zero position, for it will be understood that it is essential in the present type of apparatus to synchronize the movement or zero position of the indicator with the time of the production of the sound or compressional wave impulse.

In the ordinary type of depth sounder employing a rotating indicator which may flash when the echo comes in, the sound is produced at the zero point by means of a cam controlled or operated by the rotating indicator which closes or opens the circuit to activate the sound producer. Without some means of operating the sound producer in this manner great difficulty has been encountered in producing a sound impulse either at the zero position of the indicator or at regular periodic intervals without some rotating mechanism such as a motor or the like.

In the present invention the soundings may be made semi-automatically, that is, the indicator may be adjusted by hand to the correct depth position, or the operator may only push a button or throw a switch and set the sounding mechanism into operation.

The present invention will be more fully described in connection with the drawing in which Figure 1 shows a schematic view of the sounding system; Figure 2 shows a modification of the sound receiver; and Figure 3 shows a further modification of the indicating or operating mechanism.

In Figure 1 the sound producer is operated directly from the 110 volt power supply. It is of a type known as an impact oscillator but of considerably different construction than that usually employed as is necessary in the present case in order to cooperate with the system. It comprises a casing 3 at the outer side of which is a diaphragm 1 which has at the center an inwardly projecting core piece 2. The diaphragm 1 is bolted through a heavy rim to the case 3 by means of the bolts 4. The sounder is energized by means of the solenoid 6 in which is positioned a plunger 5 which moves up and down within the cylindrical space 70 above the core 2. The flux generated by the coil 6 has an external magnetic circuit through the casing 3 and the diaphragm 1 while the internal circuit is through the core element 2 forming a part of the diaphragm and the plunger 5.

The core 2 is extended upwards to the point where the maximum flux and pull would obtain in the core and the air gap. At the instant the plunger strikes the core 2, the velocity of the plunger is such that the contraelectromotive force substantially opposes the direct electromotive force so that the resultant potential is practically zero. It is at this point in the cycle that the sender circuit is opened.

In the center of the plunger 5 is a small hole or passage 7, which communicates into the space 70. In the upper end of the passage 7 there is provided a larger passage 71 aligned with the passage 7 and substantially continuing from it. Resting at the base of the passage 71 is a small ball 8 which is lightly held in position by means of the spring 9 which, in turn, is compressed by means of the threaded element 14 threading into the top of the plunger 5. This threaded element is a part of the rod 13 which projects from the top of the casing.

A little passage 72 is provided communicating from the passage 71 to the open space in the top part 16 of the casing. The top part 16 of the casing rests and is attached by bolts or by other suitable means to the casing 3. Resting on the flanged portion of the casing 16 is a top cap 11 which is held fast to the part 16. The top cap 11 has an inwardly extending collar 15 on which is threaded the spring 10 the other end of which is threaded to the top of the plunger 5. The spring serves merely to suspend the plunger 5 away from the core 2 in its most favorable position and also to retract the plunger 5 after it has struck the core 2 without allowing a second blow to be effected.

The spring 10 therefore must be particularly designed to have the correct tension to prevent the plunger 5 from causing a second blow, and it must also have sufficient pull to retract the plunger at the desired speed. Since ordinarily the plunger would be retracted quite quickly there is provided a vacuum valve 8, as above described, which on account of the vacuum created in the space 70 moves up rather slowly. This may be and is adjusted at such a frequency or rate of travel that the plunger takes a time approximately or of the order of one second to reach its highest position. At the top end of the rod 13 which, it will be noted, operates with the plunger, there are provided two extending fingers 17 and 18. These operate and control the application of the current for the next sounding cycle. When the element 17 has reached so far as to bring the lever switch 19 pivoted at 20 in the position indicated in the figure, a contact is made between the lines 23 and 24, and the switch relay 27 and the relay 31 are placed in series across the power supply. This closes the switches 25 and 26 and sends current over the lines 28 and 29 to the solenoid 6, thus operating the sound producer.

As the rod 13 travels down, it comes in the position where the bar 18 opens the circuit between 23 and 24 so that at the instant that the plunger strikes the diaphragm the circuit across the line is opened. The plunger 5 at its end position is practically entirely within the solenoid so that the circuit may be opened when the rate of change of flux is a maximum and when, therefore, there is little current across the switch of the impact oscillator. This makes it possible to eliminate breaking the current in steps to prevent arcing.

Upon the opening of the circuit the force drawing the plunger 5 downward is released and the spring 10 acts to pull up the plunger against the cushioning effect formed by the chamber on either side of it. The tension on the ball 8 in the passage 9 and the rate of escape of air from chamber 16 to space 70 is such that within an interval, approximately of one second more or less, it is withdrawn to its top position. In reaching the top position the circuit between the conductors 23 and 24 is closed and this immediately starts the travel of the plunger downward. During the time that the circuits 23 and 24 is closed, current is passing through the relay 31 which thereby draws the armature 32 against the tension of the spring 33 and closes the circuit of the line voltage across the resistor 48 and the timing condenser 49.

The circuit for operating the impact oscillator is closed for a sufficient time to allow the condenser 49 to be completely charged. When the circuit, having the relays 27 and 31, is broken, the armature 32 is pulled backwards by the spring 33, and the condenser 49 commences discharging across the resistor 48. The condenser 49 in connection with the resistor 48 serves to define the time interval since the discharge of a condenser across a resistance is an exponential term depending upon the time. The sound impulse travelling to the bottom of the ocean or to the object which is to retransmit a signal or reflect the impulse is received on a receiver 40 which, as shown in Figure 1, is a contact microphone for completing a circuit.

In place of this device an ordinary microphone or magnetophone, as indicated by 59, may be used and this microphone or magnetophone may operate a relay 90 in place of the contact microphone shown in Figure 1. The relay upon receipt of the impulse from the receiver 59 will close its contacts 91, 92 and act in the same manner as the contact microphone 40. Across the direct current line is a resistor 52 calibrated by a suitable scale 53 in units of distance and depth. Connected with an adjustable contact 73 to the resistor 52 is a neon tube indicator 51 in series with a battery 50 which has an adjustable rheostat 55 connected across a part of the battery. The battery 50 is connected by means of the rheostat 55 and the key 54 across the neon tube 51 and the position of the contact 57 of the rheostat may be adjusted so that the neon tube, when the key 54 is pressed, will just not flash. The contact point 57 of the rheostat is connected by means of the conductor 47 to one electrode of the contact microphone 40, the other electrode being connected by the conductor 46 to the positive side of the resistance condenser combination 48, 49. The contact microphone may have the contact electrode 41 mounted on its diaphragm and may have an initial magnetization through the coil 42 connected by the leads 37 and 38 across a part of the resistor 34 which is across the line.

The operation of the indicator is as follows: When the sound signal is received by the contact microphone 40, the positive potential of the condenser 49 is impressed upon the indicating circuit. In the indicating circuit with the key 54 open there is in series with the neon tube 51 a voltage drop across that part of the resistor 52 to which the contact 73 is connected, a voltage drop across the condenser 49 and a voltage drop across the battery 50.

This is a series circuit with the voltage impressed on the neon tube 51 by means of the resistor 52 and the voltage impressed upon the tube by means of the condenser 49 in series opposing so that if the overbalance of the circuit is such as to impress a greater potential than that of the battery 50 across the neon tube 51, the neon tube will flash. It will be noted that the indicator is so arranged that if the contact point 73 is at a point of higher positive voltage than is present in the condenser 49 when the echo comes in and if these potentials are impressed in series across the tube 51, then the neon tube will flash as the voltage across the resistor 52 adds and increases the voltage across the battery 50. Therefore if the operator simply moves the pointer or contact 73 from the upper to the lower position, he will find a place where the neon tube just ceases flashing. The operator has thereon merely to start from the zero of the scale and move the contact pointer downward until the neon tube just ceases to flash and this point gives the depth.

The circuit is really a form of a bridge circuit in which the resistor 52 forms one side and the condenser discharge circuit the other side, while the indicator and battery are balanced from one side to the other.

In Figure 3 a modified form of the indicator is shown whereby no manual operation of the pointer 73 is necessary. In this modification there is provided a neon tube 80 of glass or other transparent material in which one electrode is in the shape of a wire or plate 81 and the other electrode wires or plates 82 arranged substantially perpendicular to the plate 81.

Between the plates 82 are mica separators 83 preventing any but a horizontal discharge from the electrodes 82 to the electrode 81. In series with each electrode 82 is a resistance 84 and all the electrodes 82 are connected through their resistances 84 to the drop wire 85 corresponding to the drop wire 52 in Figure 1. In this respect the drop wire 85 provides successively different potentials to the group of electrodes 82. Since all these different potentials are continually present in each different cell of the tube 80, there is no need of any manual adjustment such as is obtained through the adjustable contact 73 of Fig. 1. When the impulse is received on the receiver and a connection is made between the conductors 46 and 47, the potential of the condenser 49 is thereupon impressed in series with the battery 50 upon all of the cells of the tube 80 and all of the tubes will therefore glow upon which the potential is sufficient to cause the discharge. In this way the cell at which the discharge begins will be an indication or measurement of the depth.

The tube 80 may be calibrated on the front in depth or it may be mounted adjacent a scale indicating the depth.

The plate 81 is connected in the same manner as the contact 73 to one side of the battery without the neon tube since the present tube takes its place. The drop wire 85 is connected similarly as the drop wire 52.

When the echo operates the receiver and throws the voltage of the condenser 49 across the tube, the tube will flash down to the point that the condenser voltage balances the drop wire voltage. If the condenser voltage is higher as it is in shallow depths, the balance will be higher and the depth indicated shallower. The tube will therefore flash down to the correct depth. The mica spacers will cause the flashes to pass horizontally and not down the tube.

Having now described my invention, I claim:

1. A system for continuous depth sounding comprising an oscillator electrically operated for producing a sound impulse, means operated in the operation of said oscillator to commence the operation of a timing circuit so that the timing circuit establishes the time interval from the instant of the production of the sound impulse, means for receiving the reflected impulse and means operated by said receiving means for establishing the time interval with relation to an indicating element including said indicating element and means manually operated for determining the proper adjustment of said indicating element to produce an indication making known the depth.

2. A system for depth sounding comprising an oscillator electrically operated for producing a sound impulse, means controlled thereby for commencing the operation of a timing circuit so that the timing circuit establishes the time interval from the instant of the production of the sound impulse, means for receiving the reflected impulses, means operated by said receiving means for establishing the time interval with relation to an indicating element, said indicating element including in part a bridge circuit having an element with a fixed potential gradient on the one half and a potential on the other half adapted to be varied with the depth and means for comparing a balance at the instant of the receipt of the reflected signal for producing an indication thereof.

3. In a system for depth measurement, a timing device comprising a resistance element calibrated for measuring depths, a source of constant potential and means connecting said source across said resistance, and an electrical timing circuit including means adapted to have an electrical potential varying continuously and progressively in one direction as a function of the time from the beginning of the measuring interval, electrical means for connecting said resistance element and said means adapted to have its potential varied in electrically parallel relationship with each other, an indicator having two connecting ends, means for adjustably positioning one of said connecting ends at a desired point on said resistance element and electrically connecting it thereto and means connected to the other end of said indicator operative at the end of the timing interval for making a connection to said timing circuit.

4. In a system for depth measurement, a timing device comprising a resistance element calibrated for measuring depths, a source of constant potential and means connecting said source across said resistance, an electrical timing circuit including means adapted to have an electrical potential varying continuously and progressively in one direction as a function of the time from the beginning of the measuring interval, electrical means connecting said resistance element and said means adapted to have its potential varied in electrically parallel relationship with each other, an indicator having two connecting ends, said indicator comprising a gaseous discharge tube and a potential source connected therewith, said source being of such magnitude as to just be below the point to cause an illumination of said discharge tube, means for adjustably connecting one of said connecting ends electrically at a desired point on said resistance element and means connected to the other of said connecting ends operative at the end of the time interval for connecting said indicator to said timing circuit.

5. In a system for depth measurement, a timing device comprising a resistance element calibrated for measuring depths, a source of constant potential and means connecting said source across said resistance, an electrical timing circuit including means adapted to have an electrical potential varying continuously and progressively in one direction as a function of the time from the beginning of the measuring interval, electrical means connecting said resistance element and said means adapted to have its potential varied in electrically parallel relationship with each other, indicator means having two connecting ends and including a discharge indicator adapted to become luminous upon the application of an electrical potential above a definite amount, means for adjustably positioning one connection of said indicating means at the desired point on said resistance element and means operative at the end of the time interval to be measured for connecting the other end of said indicating means to the timing circuit.

6. In a system for depth measurement, a timing device comprising a resistance element calibrated for measuring depths, a source of constant potential and means connecting said source across said resistance, and an electrical timing circuit including means adapted to have an electrical potential varying continuously and progressively in one direction as a function of the time from the beginning of the measuring interval, electrical means for connecting said resistance element and said means adapted to have its potential varied in electrically parallel relationship with each other, an indicator having two connecting ends, means for adjustably positioning one of said connecting ends at a desired point on said resistance element, and means including a sound pickup unit for completing the connection of the other end of the indicator with the timing circuit at the end of the interval to be measured.

7. In a system for depth measurement, a timing device comprising a resistance element calibrated for measuring depths, a source of constant potential and means connecting said source across said resistance, and an electrical timing circuit including means adapted to have an electrical potential varying continuously and progressively in one direction as a function of the time from the beginning of the measuring interval, electrical means for connecting said resistance element and said means adapted to have its potential varied in electrically parallel relationship with each other, an indicator having two connecting ends, said indicator including a discharge tube, means for connecting one of said indicator ends to the desired point on said resistance element, thereby indicating the depth measurement and means including a sound pickup device adapted to be operated by a sound receiver to connect the indicator to said timing circuit.

8. A depth or height measuring system having a sound producer, means directly controlled by the operation of the sound producer to repeat automatically successive operations thereof, means operated synchronously with the production of the sound for commencing the operation of a time measuring circuit, means for receiving an echo and fixing the magnitude of the time measuring interval to give a measure of the depth on said time measuring circuit.

9. A depth or height measuring system having a sound producer, means directly controlled by the operation of the sound producer to repeat automatically successive operations thereof and a time measuring means including a sound receiver, means for automatically commencing the operation of said time measuring means synchronously with the instant of the production of the sound waves and means associated with said sound receiver for fixing the magnitude of the time interval upon the receipt of a reflected echo and means manually adjustable to indicate the measurement of said time interval.

10. In a system for depth or height measurement, a timing device comprising a source of potential, a condenser, a circuit for said condenser adapted to charge said condenser from said source and to vary continuously and progressively during the time interval the magnitude of the charge on the condenser in accordance with a fixed law, means for deriving from said source a potential whose magnitude varies with variations in the magnitude of the potential of said source, said variations being slow variations of such a nature as to produce no substantial change in the potential of said source between the beginning and end of a time interval being measured, and means determining the magnitude of the time interval including means for comparing at the end of the time interval the magnitude of the potential then existing on the condenser with the magnitude of said derived potential.

11. In a system for depth or height measurement, a timing device comprising a source of potential, a timing element including a condenser shunted by a resistance, means for charging said condenser from said source prior to the beginning of said time interval, and for disconnecting said condenser from said source at the beginning of the time interval, whereby during the time interval the condenser will discharge through said resistance, means for deriving a potential directly from said source and means for comparing at the end of the time interval the potential then existing on said condenser with said derived potential.

12. In a system for depth or height measurement, a timing device comprising a source of potential, a timing element including a condenser shunted by a resistance, means for charging said condenser from said source, means for deriving a potential directly from said source and means for comparing at the end of the time interval the potential then existing on said condenser with said derived potential.

13. In a system for depth or height measurement, a timing device comprising a source of potential, a condenser, a circuit for said condenser adapted to charge said condenser from said source and to vary continuously and progressively during the time interval the magnitude of the charge on the condenser in accordance with a fixed law, a potentiometer resistance having its end terminals connected across said source and means determining the magnitude of the time interval including means for comparing at the end of the time interval the magnitude of the potential then existing on the condenser with the magnitude of the potential across a portion of said potentiometer.

14. In a system for depth or height measurement, a timing device comprising a source of potential, a condenser, a circuit for said condenser adapted to charge said condenser from said source and to vary continuously and progressively during the time interval the magnitude of the charge on the condenser in accordance with a fixed law, means for deriving from said source a potential whose magnitude varies with variations in the magnitude of the potential of said source, said variations being slow variations of such a nature as to produce no substantial change in the potential of said source between the beginning and end of a time interval being measured, the magnitude of said derived potential being, however, substantially equal to the charge on the condenser at the end of the time interval, and means determining the magnitude of the time interval including means for comparing at the end of the time interval the magnitude of the potential then existing on the condenser with the magnitude of said derived potential.

15. In a system for depth or height measurement, a timing device comprising a source of potential, a timing element including a condenser shunted by a resistance, means for charging said condenser from said source prior to the beginning of said time interval and for disconnecting said condenser from said source at the beginning of the time interval, whereby during the time interval the condenser will discharge through said resistance, means for deriving a potential directly from said source of a magnitude substantially equal to the charge on the condenser at the end of the time interval and means for comparing at the end of the time interval the potential then existing on said condenser with said derived potential.

16. In a system for depth or height measurement, a timing device comprising a source of potential, a timing element including a condenser shunted by a resistance, means for charging said condenser from said source, means for deriving a potential directly from said source of a magnitude substantially equal to the charge on the condenser at the end of the time interval and means for comparing at the end of the time interval the potential then existing on said condenser with said derived potential.

17. In a system for depth or height measurement, a timing device comprising a source of potential, a condenser, a circuit for said condenser adapted to charge said condenser from said source and to vary continuously and progressively during the time interval the magnitude of the charge on the condenser in accordance with a fixed law, a potentiometer resistance having its end terminals connected across said source and means determining the magnitude of the time interval including means for comparing at the end of the time interval the magnitude of the potential then existing on the condenser with the magnitude of the potential across a portion of said potentiometer, the latter potential being substantially equal to the charge on the condenser at the end of the time interval.

18. In a system for depth or height measurement, a timing device comprising a source of potential, a condenser, means for charging the condenser from said source, a discharge circuit for said condenser having a predetermined time constant, means for deriving from said source a potential whose magnitude varies with variations of said source potential, said variations being slow variations of such a nature as to produce no substantial change in the potential of said source between the beginning and end of a time interval being measured, means for initiating the discharge of said condenser at the beginning of a time interval, means for adjusting said derived potential to make it substantially equal to the charge on the condenser at the end of the time interval, and means for comparing the condenser potential and said derived potential at the end of the time interval.

19. A system for depth or height measurement, a timing device including a source of potential, a condenser, means for charging the condenser from said source, a discharge circuit for said condenser having a predetermined time constant, means for deriving from said source a potential whose magnitude varies with variations of said source potential, said variations being slow variations of such a nature as to produce no substantial change in the potential of said source between the beginning and end of a time interval being measured, means for initiating the discharge of said condenser at the beginning of a time interval, means for adjusting the magnitude of said derived potential to make it substantially equal to the potential on said condenser at the end of the time interval and means for opposing said derived potential to said condenser potential and means for indicating when the difference between the potential on the condenser at the end of the time interval and the derived potential is substantially zero.

EDWIN E. TURNER, JR.